US012075781B2

(12) United States Patent
Best et al.

(10) Patent No.: US 12,075,781 B2
(45) Date of Patent: Sep. 3, 2024

(54) READY-TO-USE BARRIER AND KNOCKDOWN PESTICIDES

(71) Applicant: United Industries Corporation, Earth City, MO (US)

(72) Inventors: Amie Best, Earth City, MO (US); Kristina Thompson, Earth City, MO (US); Oliver Ilagan, Earth City, MO (US); Patrick Long, Earth City, MO (US); Josh Matta, Earth City, MO (US)

(73) Assignee: United Industries Corporation, Earth City, MO (US)

( * ) Notice: Subject to any disclaimer, the term of this patent is extended or adjusted under 35 U.S.C. 154(b) by 0 days.

(21) Appl. No.: 18/067,456

(22) Filed: Dec. 16, 2022

(65) Prior Publication Data

US 2023/0189812 A1 Jun. 22, 2023

Related U.S. Application Data

(60) Provisional application No. 63/290,303, filed on Dec. 16, 2021.

(51) Int. Cl.
| | |
|---|---|
| *A01N 53/00* | (2006.01) |
| *A01N 25/04* | (2006.01) |
| *A01N 25/30* | (2006.01) |
| *A01N 43/30* | (2006.01) |
| *A01N 43/80* | (2006.01) |
| *A01P 7/00* | (2006.01) |
| *A01P 7/04* | (2006.01) |

(52) U.S. Cl.
CPC ............. *A01N 53/00* (2013.01); *A01N 25/04* (2013.01); *A01N 25/30* (2013.01); *A01N 43/30* (2013.01); *A01N 43/80* (2013.01); *A01P 7/00* (2021.08); *A01P 7/04* (2021.08)

(58) Field of Classification Search
CPC .................................................. A01N 53/00
See application file for complete search history.

(56) References Cited

U.S. PATENT DOCUMENTS

| | | | |
|---|---|---|---|
| 4,595,679 A | 6/1986 | Broadbent | |
| 5,178,871 A | 1/1993 | Thill | |
| 5,542,207 A | 8/1996 | Morris, Sr. | |
| 6,387,960 B1 | 5/2002 | Mueninghoff | |
| 6,531,144 B2 | 3/2003 | Kashima et al. | |
| 8,293,733 B2 * | 10/2012 | Casana Giner et al. ............ A01N 47/40 514/342 | |
| 9,339,030 B2 * | 5/2016 | Burke ................. A01N 25/30 | |
| 9,414,597 B2 | 8/2016 | Buchholz et al. | |
| 10,390,535 B2 | 8/2019 | Van Der Lelie et al. | |
| 10,537,110 B2 | 1/2020 | Brahm et al. | |
| 10,772,322 B2 | 9/2020 | Reinhard et al. | |
| 11,122,789 B2 | 9/2021 | Thorne | |
| 2007/0065476 A1 | 3/2007 | Sexton et al. | |
| 2009/0163582 A1 * | 6/2009 | Wang ................. A01N 25/06 514/464 | |
| 2014/0137808 A1 | 5/2014 | White | |
| 2015/0111742 A1 | 4/2015 | Gomez et al. | |
| 2017/0290328 A1 * | 10/2017 | Rowley ............... A01N 37/40 | |
| 2017/0347659 A1 | 12/2017 | Caldwell et al. | |
| 2021/0112810 A1 | 4/2021 | Andaloro et al. | |
| 2021/0127680 A1 | 5/2021 | Rengan et al. | |
| 2021/0298304 A1 | 9/2021 | Shroff et al. | |

FOREIGN PATENT DOCUMENTS

| | | |
|---|---|---|
| BR | 10 2013 019647-9 A2 | 3/2015 |
| BR | 112016008526-4 A2 | 4/2015 |
| CA | 2 759 237 A1 | 11/2010 |
| CA | 2 927 454 A1 | 4/2015 |
| CA | 2 927 784 A1 | 4/2015 |
| CA | 2 963 328 A1 | 4/2016 |
| CA | 3 019 854 A1 | 10/2017 |
| CA | 3 032 267 A1 | 2/2018 |
| CN | 102383304 A | 3/2012 |
| CN | 103314992 B | 5/2014 |
| CN | 104026156 A | 9/2014 |
| CN | 104068071 A | 10/2014 |
| CN | 105532714 A | 5/2016 |
| DE | 10 2009 028 001 A1 | 1/2011 |
| EP | 0 771 526 A2 | 5/1997 |
| EP | 2 000 029 A1 | 12/2008 |
| EP | 2 039 248 A1 | 3/2009 |
| EP | 2 481 284 A2 | 8/2012 |
| EP | 2 534 951 A1 | 12/2012 |
| EP | 2 429 286 B1 | 8/2015 |
| EP | 2 094 087 B1 | 8/2016 |
| EP | 3 057 420 B1 | 12/2018 |
| GB | 2 187 644 A | 9/1987 |
| IT | MI20050728 A1 | 10/2006 |
| JP | 2020-121955 A | 8/2020 |
| KR | 10-1866716 B1 | 6/2018 |
| WO | 96/16543 A2 | 6/1996 |
| WO | 2006/114212 A2 | 11/2006 |
| WO | 2006/128863 A1 | 12/2006 |
| WO | 2007/095229 A2 | 8/2007 |
| WO | 2011/147952 A1 | 12/2011 |
| WO | 2014/151328 A1 | 9/2014 |

(Continued)

OTHER PUBLICATIONS

Appah, Crop Protection (2020), 127, 104961.*

(Continued)

*Primary Examiner* — Nizal S Chandrakumar
(74) *Attorney, Agent, or Firm* — Merchant & Gould P.C.

(57) ABSTRACT

The present disclosure provides compositions and methods for controlling pests. A ready-to-use barrier and knockdown pesticide composition comprises a killing agent; a knockdown agent; a surface-active agent; and a carrier, and the composition is a water-in-oil emulsion. A method for controlling pests comprises applying the RTU barrier and knockdown pesticide composition directly to a target pest using a sprayer. The present compositions and methods provide average users an immediate indication of the knockdown efficiency against target pests.

19 Claims, No Drawings

(56) References Cited

FOREIGN PATENT DOCUMENTS

| | | |
|---|---|---|
| WO | 2017/063973 A1 | 4/2017 |
| WO | 2020/012312 A1 | 1/2020 |
| WO | 2020/075167 A1 | 4/2020 |
| WO | 2021/007545 A1 | 1/2021 |
| WO | 2021/054315 A1 | 3/2021 |
| WO | 2021/067678 A1 | 4/2021 |
| WO | 2021/076693 A1 | 4/2021 |
| WO | 2021/127126 A1 | 6/2021 |
| WO | 2022/009224 A1 | 1/2022 |
| WO | 2022/018745 A1 | 1/2022 |
| WO | 2022/034611 A1 | 2/2022 |

OTHER PUBLICATIONS

Communique, ICI Americas, M1691, 1-22, 1976 .*
International Search Report and Written Opinion for Application No. PCT/US2022/81865 mailed Mar. 28, 2023.

* cited by examiner

READY-TO-USE BARRIER AND KNOCKDOWN PESTICIDES

CROSS-REFERENCE TO RELATED APPLICATION

This application claims priority to U.S. Provisional Patent Application No. 63/290,303, filed Dec. 16, 2021, the disclosure of which is hereby incorporated by reference in its entirety.

INTRODUCTION

Pesticides and insecticides are extensively employed to kill household pests and/or insects such as the common housefly, cockroaches, and the like. Pesticides which have acquired common usage are conventionally utilized, often from an aerosol container, in the form of aqueous emulsions, aqueous colloidal suspensions, aqueous solutions, or from an organic solvent medium. Conventionally the use of oil-in-water emulsion in aqueous medium is the preferred form from the standpoint of economics and ecological considerations. However, many of the effective active pesticidal agents are difficult to solubilize or are not soluble at all in water and are completely encapsulated in droplets of oil-in-water emulsion, which would not cause direct contact with the target pests when in use. In these instances, the activity and efficiency of such pesticides could be significantly reduced.

Many conventional pesticide products also involve the use of organic solvents as the carrier for the pesticide in certain applications and with certain active pesticidal agents in order to obtain solubility and the essential activity. However, involvement of organic solvent is becoming more and more unfavorable due to the environmental and human health concerns and the general trend for demanding low Volatile Organic Compounds (VOC) household products.

Many pesticide products are stored in aerosol containers and the application of such pesticides form aerosols. Aerosols application of pesticides have a number of drawbacks. For example, aerosol cans contain only a limited amount of pesticides, so they are not intended for long-time applications. The cost per use can be high since they are considered ready to use and premixed. Additionally, most aerosols also leave behind a considerable odor or volatile, which may linger for a significant time period. In some aerosol applications, people and pets are instructed to leave the area until it has been thoroughly ventilated and vapors have dispersed. Some aerosol pesticides may also have the drawback of not being active killing agents for an extended period of time compared to their liquid counterparts. Further, due to the inhalation risk with aerosols, a respirator may be required by the applicator to prevent breathing in any of the tiny particles dispersed from the can. Aerosols may also be flammable and dangerous if a large amount of organic solvent is contained or the aerosol container is not properly operated.

It is also recognized that in formulating a pesticide, particularly those having household usage, it is essential not only to provide a formulation providing a high kill of the insects, but it is also essential to have rapid knockdown of the insects. Knockdown, as the term is used herein, is the characteristic of the pesticide whereby the insect, if a flying insect such as a common housefly, is knocked out of the air or, if a crawling insect such as a cockroach, is caused to lie dormant with low activity or mobility or moving in an inconsistent manner or giving the appearance of death to the insects, even if not dead. According to the guidance on efficiency testing for pesticides targeting certain invertebrate pests of the Environmental Protection Agency (EPA) of the United States, to make "knockdown" or "quick kill" or "kills on contact" claims for pesticides, data should be provided that show (1) ≥90% knockdown within 10 seconds for stinging Hymenoptera (including fire ants) or within 30 seconds for all other arthropods; and (2) ≥90% mortality by 96 hours post-treatment, Rapid knockdown is essential in such pesticides since the average user equates the effectiveness of the pesticide with the falling out of the air of a flying insect, such as the common housefly, or with the paralyzing of an insect, if a crawling insect such as the common cockroach, even though the insect, although not knocked down or paralyzed, may die later. To obtain the desired knockdown, it has been necessary to utilize the active insecticidal agent in larger amounts than necessary to obtain a kill. This is undesirable from the standpoint of cost and ecology.

Although the knockdown phenomenon, and the need for knockdown, has been known, few solutions have been developed to obtain a pesticide formulation that has both high kill and rapid knockdown of the pests, with a full satisfaction of cost, safety, and environment requirement. Many existing pesticide and insecticide products have only killing power or are used as barrier products but do not give an average user an immediate indication of the knockdown efficiency of the products. Accordingly, there is a need for an effective means of providing both killing and knockdown power in a single pesticidal composition without using large amounts of the pesticidal agent, or combinations of expensive pesticidal agents.

U.S. Pat. No. 4,595,679 relates to a liquid insecticidal composition comprising an active insecticide, a liquid medium for emulsifying, dispersing, or solubilizing the insecticide, and at least one of N-vinyl 2-pyrrolidone, N-methyl 2-pyrrolidone, and 2-pyrrolidone. The amphiphilic solvency characteristics of the 2-pyrrolidones is allegedly effective to increase the penetration of the insecticide into the body of the insect to provide enhanced insect knockdown.

U.S. Pat. No. 6,387.960 discloses an agricultural formulation containing monoglycerides that are used as emulsifiers, dispersants, wetting agents and solvents for adjuvant concentrates, pesticide concentrates and ready-to-use pesticide compositions.

U.S. Pat. No. 6,531,144 discloses a microemulsion aerosol composition including an insecticide, a mixture of sorbitan fatty ester and polyoxyethylene polyoxypropylene alkyl ether surfactants, an aliphatic hydrocarbon solvent, water and a liquefied petroleum gas as a propellant. The composition is a single-phase formulation and does not require shaking the container containing the composition prior to use.

U.S. Patent Application No. 20090163582 discloses a pesticide concentrate that comprises an inert emulsifier that is either a polyglycerol fatty acid ester, a sorbitan fatty acid ester or a combination thereof, a pesticide and a solvent that is either an inert acetyl ester, a methyl ester, acetyltributyl citrate, or white mineral oil or combinations thereof.

It is against the above background the present disclosure provides advantages and advancements.

Ready-to-Use Barrier and Knockdown Pesticides

The present disclosure provides a ready-to-use (RTU) barrier and knockdown pesticide composition. The RTU pesticide composition is a water-in-oil emulsion and includes a killing agent; a knockdown agent; a surface-active agent; and a carrier. The present pesticide composition has a combined barrier and knockdown function against common pests including but not limited to flying insects and crawling insects such as cockroaches, providing average users an immediate indication of the knockdown efficacy in seconds and a high efficiency in killing target pests. The present composition delivers a greater knockdown performance than that demonstrated by a conventional formulation without knockdown agent.

The present disclosure is at least in part based on the discovery that some pesticides have great knockdown performance, but others do not. "Knockdown," as the term is used herein, is the characteristic of the pesticide whereby the pest, if a flying pest such as a common housefly, is knocked out of the air or, if a crawling pest such as a cockroach, is caused to lie dormant with low activity or mobility or moving in an inconsistent manner or giving the appearance of death to the insects, even if not dead. Rapid knockdown is essential in such pesticides since the average user equates the effectiveness of the pesticides with the falling out of the air of a flying pest, such as the common housefly, or with the paralyzing of a pest, if a crawling pest such as the common cockroach, even though the pest, although not knocked down or paralyzed, may die later. According to the Environmental Protection Agency (EPA) of the United States, to make "knockdown" or "quick kill" or "kills on contact" claims for pesticides, data should be provided that show (1) ≥90% knockdown within 10 seconds for stinging Hymenoptera (including fire ants) or within 30 seconds for all other arthropods; and (2) ≥90% mortality by 96 hours post-treatment.

It was surprisingly found that a small amount of effective knockdown agent in the present pesticide composition could provide average users an immediate indication of the effectiveness within seconds after applying the composition to a target pest or a target substrate or a target area where the pest is or will be located on. Pests that are knocked down lose significant mobility or activity, and thereby can be easily captured or extinguished, which not only provides users with unmatched convenience and also improves users' satisfaction. By contrast, compositions without a knockdown agent, although can still have good barrier function, they do not provide average users an immediate indication of effectiveness.

It is also surprisingly found that selective combination of a knockdown agent and a killing agent resulted in an unexpected synergistic effect and high efficacy in both knockdown and killing of target pests.

In some embodiments, the knockdown agent of the present composition is a synthetic pyrethroid including but not limited to tetramethrin, imiprothrin, prallethrin (ETOC®), momfluorothrin (SUMIFREEZE®), and combinations thereof.

In some embodiments, the killing agent is a natural pyrethrum or synthetic pyrethroid, including but not limited to permethrin, deltamethrin, bifenthrin, fluvalinate, fenvalerate, esfenvalerate, lambda cyhalothrin, tetramethrin, sumithrin, cyfluthrin, resmethrin, allethrin, bioallethrin, esbiothrin, s-bioallethrin (ESBIOL®), d-allethrin; cypermethrin; zeta cypermethrin, tau fluvalinate, channel blocking insecticide, acetylcholinesterase inhibitor, oxadiazines; organophosphate, chlorpyriphos, acephate, neonicotinoid insecticide, thiamethoxam, imidacloprid, acetamiprid, thiacloprid, clothianidin, nitenpyram, insect growth regulator, teflubenzuron, flufenoxuron, bistrifluoron, hexaflumuron; juvenile hormone mimic such as pyriproxyfen, methoprene and fenoxycarb, fermentation insecticide such as abamectin, spiromesifen, spinosad, and Bacillus thuringiensis, plant oil insecticide such as cinnamon, rosemary, wintergreen, citrus and clove oils, acaricide, miticide, fungicide, herbicide and combinations thereof.

In certain embodiments, the knockdown agent is selected from the group consisting of tetramethrin, imiprothrin, prallethrin (ETOC®), momfluorothrin (SUMIFREEZE®), and combinations thereof. In certain embodiments, the killing agent is cyhalothrin.

In some embodiments, the present composition may further include an additional synergist such as piperonyl butoxide, N-octylbicycloheptenedicarboximide, propargyl propyl phenylphosphonate and combinations thereof. In embodiments, the present composition may optionally include an antioxidant such as ethoxyquin or tertiary butylhydroquinone (TBHQ), and an ultraviolet light absorber such as ethylhexyl methoxycinnamate or benzophenone, or other additives.

In some embodiments, the carrier of the present composition may include a liquid solvent such as aromatics, chlorinated aromatics, alcohol, glycol ether, glycol ester, ketone, dimethyformamide, dimethyl sulphoxide, water, or combinations thereof.

In some embodiments, the surface-active agent of the present composition may include fatty acid ester, sorbitan fatty acid ester (Lubricit™ SMO), alkyl alcohol ethoxylate (Alkamuls® AL-CS 20, Alkamuls® AL-CS 25), or combinations thereof. In embodiments, the surface-active agent may have a Hydrophil-Lipophil Balance (HLB) value from about 3 to about 9, or from about 4 to about 8, or from about 5 to about 7.

In other aspects of the invention, the present composition further comprises a hydrocarbon solvent selected from the group consisting of vegetable oil, mineral oil, mineral spirits, petroleum, alkylbenzene, spindle oil, or derivatives or combinations thereof.

The present composition may optionally include a corrosion inhibitor such as sodium benzoate. The present composition may optionally include a propellant such as nitrogen, butane, isobutane, propane, hydrofluorocarbon, or combinations thereof.

The present disclosure is also directed to a RTU product comprising a container and the present RTU barrier and knockdown pesticide composition placed therein. The container may be an aerosol type container or a non-aerosol type container. Preferably, the container is a non-aerosol type container such as a trigger spray (manual or powered).

The present disclosure is also directed to a method for controlling pest comprising applying a RTU barrier and knockdown pesticide composition directly to a pest, the composition comprising: a killing agent; a knockdown agent; a surface-active agent; and a carrier, wherein the composition is a water-in-oil emulsion. The method may comprise treating a target pest or a substrate or an area where a target pest is located on by applying the aerosol or trigger spray product containing the RTU barrier and knockdown pesticide composition to the surface of the target pest or the target substrate or the target area. The RTU aerosol or trigger spray product is used for pest control and the target substrates include any indoor or outdoor surfaces, including but not limited to concrete, vinyl, plywood, ceramic, glass, plastic, or plant surfaces. The target area may include any structural features; premises; residential, commercial, agricultural or industrial structural features; commercial, agricultural or industrial estates; gardens.

The present invention is also directed to a method for making the present compositions and the RTU products thereof. The method may include mixing the components of the RTU composition together by conventional techniques.

These and other features, aspects, advantages of the present invention will become better understood with reference to the following description and appended claims.

Selected Definitions

As used herein, "weight percent," "wt %," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt %, etc.

As used herein, "g" represents gram; "L" represents liter; "mg" represents "milligram ($10^{-3}$ gram);" "mL" or "cc" represents milliliter ($10^{-3}$ liter); "nm" represents nanometer ($10^{-9}$ meter); micrometer is $10^{-6}$ meter. The units "mg/100 g," "mg/100 mL," or "mg/L" are units of concentration or content of a component in a composition. One "mg/L" equals to one ppm (part per million). "Da" refers to Dalton, which is the unit for molecular weight; One Da equals to one g/mol. The unit of temperature used herein is degree Celsius (° C.).

The term "about" is used in conjunction with numeric values to include normal variations in measurements as expected by persons skilled in the art, and is understood to have the same meaning as "approximately" and to cover a typical margin of error, such as +/−10% of the stated value. The term "about" also encompasses amounts that differ due to different equilibrium conditions for a composition resulting from a particular initial composition. Whether or not modified by the term "about," the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes having two or more compounds that are either the same or different from each other. It should also be noted that the term "or" is generally employed in its sense including "and/or" unless the content clearly dictates otherwise.

In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

The term "substantially free" may refer to any component that the composition of the disclosure lacks or mostly lacks. When referring to "substantially free" it is intended that the component is not intentionally added to compositions of the disclosure. Use of the term "substantially free" of a component allows for trace amounts of that component to be included in compositions of the disclosure because they are present in another component. However, it is recognized that only trace or de minimus amounts of a component will be allowed when the composition is said to be "substantially free" of that component. Moreover, if a composition is said to be "substantially free" of a component, if the component is present in trace or de minimus amounts it is understood that it will not affect the effectiveness of the composition. It is understood that if an ingredient is not expressly included herein or its possible inclusion is not stated herein, the disclosure composition may be substantially free of that ingredient. Likewise, the express inclusion of an ingredient allows for its express exclusion thereby allowing a composition to be substantially free of that expressly stated ingredient.

The phrase "target substrate" as used herein means a household pest or germ, a home, a lawn or garden pest, a garden, an animal pest, a human pest, or a combination of an animal and an animal pest or anything that carries a pest. A "pest" used herein is defined as any unwanted living organism that is detrimental to human being or a beneficial animal such as a pet, or that annoys a person or a beneficial animal. Pests include all insects and spiders. The term "pest" includes organisms belonging to Arthropods, in particular Chelicerata, Tracheata, but not Crustacea. Pests also include Myriapoda, Arachnida, or Insecta. Examples of pests include but are not limited to dust mites, scabies mites, ectoparasitic mites, hair mites (including dog follicle mite), chiggers, ticks (hard ticks, soft ticks, cattle ticks), scorpions, spiders, centipedes, lice, fleas, cockroaches, keds, bot flies, worms, screwworms, houseflies, filth flies, mosquitoes, biting flies, true bugs, stinging bees and wasps, ants, fire ants, carpenter ants, beetles, wood destroying beetles, termites.

The pests described herein can be any living stage of any flying, crawling, or stinging pest. The pests also encompass "animal pest" or "pet pest." The pests also include weeds that compete with cultivated plants or unwanted plants that occur in a beneficial environment. The pests also include bacteria, fungi, other parasitic organisms or reproductive parts thereof, any organism similar to or allied with the foregoing or any infectious substances which can directly or indirectly cause harm in any beneficial animal, person, plant, structure (e.g., a home due to pests such as termites), pet or parts thereof. It is noted that certain pests can only affect human being but not a beneficial animal.

The term "target area" used herein may include any structural features; premises; residential, commercial, agricultural or industrial structural features; residential, commercial, agricultural or industrial estates; gardens.

As used herein, the term "aerosol" refers to a suspension system of solid or liquid particles enclosed under pressure and able to be released as a spray by means of a propellant. As used herein, "non-aerosol" refers to a suspension of solid or liquid or multi-phase particles or droplets enclosed in a container free from a propellant.

As used herein, the term "adjuvant" refers to an enhancing agent that improves the activity of the pesticide, such as a solvent, an emulsifier, a synergist, a UV absorber, a corrosion inhibitor, an antioxidant and a fragrance.

As used herein, the phrase "biologically active ingredient" refers to any active ingredient or synergist in addition to the pesticide used in the composition.

The methods, systems, apparatuses, and compositions of the present disclosure may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

DETAILED DESCRIPTION

Ready-to-Use Barrier and Knockdown Pesticide Composition

The present disclosure provides a ready-to-use (RTU) barrier and knockdown pesticide composition, comprising: a killing agent; a knockdown agent; a surface-active agent; and a carrier; wherein, the composition is a water-in-oil emulsion.

The knockdown agent of the present composition may include tetramethrin, imiprothrin, prallethrin (ETOC®), momfluorothrin (SUMIFREEZE®), and combinations thereof. The knockdown agent of the present RTU composition may be from about 0.01 wt % to about 1 wt %, or from about 0.02 wt % to about 0.8 wt %, or from about 0.03 wt % to about 0.6 wt %, or from about 0.04 wt % to about 0.4 wt %, or from about 0.05 wt % to about 0.2 wt %, or from about 0.06 wt % to about 0.1 wt %, based on the total weight of the RTU composition.

The killing agent of the present RTU composition is a natural pyrethrum or synthetic pyrethroid, including but not limited to permethrin, deltamethrin, bifenthrin, fluvalinate, fenvalerate, esfenvalerate, lambda cyhalothrin, tetramethrin, cyfluthrin, resmethrin, allethrin, bioallethrin, esbiothrin, s-bioallethrin (ESBIOL®), d-allethrin; cypermethrin; zeta cypermethrin, tau fluvalinate, channel blocking insecticide, acetylcholinesterase inhibitor, oxadiazines; organophosphate, chlorpyriphos, acephate, neonicotinoid insecticide, thiamethoxam, imidacloprid, acetamiprid, thiacloprid, clothianidin, nitenpyram, insect growth regulator, teflubenzuron, flufenoxuron, bistrifluoron, hexaflumuron; juvenile hormone mimic such as pyriproxyfen, methoprene and fenoxycarb, fermentation insecticide such as abamectin, spiromesifen, spinosad, and *Bacillus thuringiensis*, plant oil insecticide such as cinnamon, rosemary, wintergreen, citrus and clove oils, acaricide, miticide, fungicide, herbicide and combinations thereof. The killing agent of the present RTU composition may be from about 0.01 wt % to about 1 wt %, or from about 0.02 wt % to about 0.8 wt %, or from about 0.03 wt % to about 0.6 wt %, or from about 0.04 wt % to about 0.4 wt %, or from about 0.05 wt % to about 0.2 wt %, or from about 0.06 wt % to about 0.1 wt %, based on the total weight of the RTU composition.

In certain embodiments, the knockdown agent is imiprothrin, or prallethrin (ETOC®), or both. Structures of imiprothrin and prallethrin are shown below. It is noted that the knockdown agent used herein encompasses all stereoisomers thereof.

Imiprothrin

Prallethrin

In preferred embodiments, the killing agent is cyhalothrin. Cyhalothrin used herein includes gamma-cyhalothrin, or lambda-cyhalothrin, or both. Lambda-cyhalothrin is known as a 1:1 (racemic) mixture of gamma-cyhalothrin and the mirror image isomer thereof. In certain embodiments, the killing agent is lambda-cyhalothrin. In certain embodiments, the killing agent is gamma-cyhalothrin. The structure of gamma-cyhalothrin and lambda-cyhalothrin are respectively shown below:

gamma-cyhalothrin lambda-cyhalothrin = 1:1 mixture of gamma-cyhalothrin and this mirror isomer The surface-active agent of the present composition may include fatty acid ester generally derived from esterification of fatty acids and alcohols, including but not limited to decaglycerol hexaoleate, sorbitan monooleate, ethoxylated sorbitan fatty acid ester blend, polyoxyethylene sorbitan monooleate, polyoxyethylene sorbitan monopalmitate, triglycerol diisostearate, decaglycerol hexaoleate, trigylcerol diisostearate, or combinations thereof. Non-limiting examples of commercially available fatty acid emulsifiers include sorbitan fatty acid ester (Lubricit™ SMO), alkyl alcohol ethoxylate (Alkamuls® AL-CS 20, Alkamuls® AL-CS 25). The surface-active agent of the present RTU composition may be from about 0.005 wt % to about 5 wt %, or from about 0.01 wt % to about 4 wt %, or from about 0.015 wt % to about 3 wt %, or from about 0.02 wt % to about 2 wt %, or from about 0.025 wt % to about 1 wt %, or from about 0.03 wt % to about 0.5 wt %, or from about 0.04 wt % to about 0.25 wt %, or from about 0.05 wt % to about 0.1 wt %, based on the total weight of the RTU composition.

Preferably, the surface-active agent may have a relatively low Hydrophil-Lipophil Balance (HLB) value, such as from about 3 to about 9, or from about 4 to about 8, or from about 5 to about 7, or from about 6 to about 7. It was surprisingly found that the surface-active agents having relatively low HLB greatly improved the efficiency compared with those having HLB value higher than 10. Without wishing to be bound by any particular theory, it is believed that the relatively low HLB surface-active agent used in the present composition can provide a variety of functions. They can serve as effective emulsifiers in the RTU composition for making stable water-in-oil emulsions. The hydrophobic killing/knockdown agents of the water-in-oil emulsion are positioned on the outer surface of emulsion droplets, as opposed to the oil-in-water emulsion wherein the hydrophilic agents are encapsulated inside the emulsion droplets. Thus, the killing/knockdown agents on the surface of the water-in-oil emulsion droplet can directly and immediately contact with the target substrate (i.e., the outer skin of pests) or the target area (i.e., home or garden) when applied thereto and considerably improve the efficiency of killing/knockdown. The surface-active agents having low HLB are also considered as inerts, which are generally regarded as materials having a lower toxicity.

In some embodiments, the present composition further includes a thickener, or co-emulsifier, or viscosity regulator/modifier. Non-limiting examples of the thickener include cellulose derivatives such as xanthan, carboxymethyl cellulose, alginates, carrageenan, locust bean gum, tragacanth and guar, polyacrylic acid derivatives (carbomer), modified clays, finely divided silica, or combinations thereof.

In some embodiments, the present composition may further include a synergist such as piperonyl butoxide (PBO), N-octylbicycloheptenedicarboximide, propargyl propyl phenylphosphonate and combinations thereof. An effective amount of a synergist such as PBO in the present composition can enhance the kill activity of the natural pyrethrum or synthetic pyrethroid killing agents against both flying and crawling pests. The synergist of the present RTU composition may be from about 0.05 wt % to about 5 wt %, or from about 0.1 wt % to about 4 wt %, or from about 0.2 wt % to about 3 wt %, or from about 0.3 wt % to about 2 wt %, or from about 0.4 wt % to about 1 wt %, based on the total weight of the RTU composition.

In some embodiments, the present composition can include one or more carriers and/or diluents in addition such as, for example, any solid or liquid carrier or diluent that is commonly used in pesticidal, insecticidal, agricultural, or horticultural compositions. Any included additional carrier or diluent will not reduce the pesticidal efficacy of the composition, relative to the efficacy of the composition in the absence of the additional component. The carrier or diluent will not affect the physical characteristics of the composition such that the composition no longer has the desired physical profile. Carriers and diluents can include, for example, solvents (e.g., water, alcohols, acids, and esters); vegetable and/or plant-based oils as well as ester derivatives thereof (e.g., wintergreen oil, cedarwood oil, rosemary oil, peppermint oil, geraniol, rose oil, palmarosa oil, citronella oil, citrus oils (e.g., lemon, lime, and orange), dillweed oil, corn oil, sesame oil, cottonseed oil, safflower oil, wheat germ oil, pine oil, cormint oil, soybean oil, palm oil, vegetable oil, olive oil, peanut oil, and canola oil). The carrier may also include a liquid solvent such as aromatics, chlorinated aromatics, glycol ether, glycol ester, ketone, dimethyformamide, dimethyl sulphoxide, or combinations thereof. The carrier of the present RTU composition may be from about 0.1 wt % to about 10 wt %, or from about 0.3 wt % to about 8 wt %, or from about 0.5 wt % to about 6 wt %, or from about 0.7 wt % to about 4 wt %, or from about 0.9 wt % to about 2 wt %, or from about 1 wt % to about 1.8 wt %, based on the total weight of the RTU composition.

In certain embodiments, the carrier of the present disclosure comprises from about 0.5% to about 5%, or from about 1% to about 3% or from about 1.5% to about 2% of 1-butoxy-2-propanol (known as butyl propasol or propylene glycol n-butyl ether).

In some embodiments, the present composition further comprises a hydrocarbon solvent such as aliphatic solvent (C16-C25), isoparaffins, normal paraffins (C10-C20), dearomatic aliphatics, C9-C11, isoparaflinic solvent, C11-C12 isoparaflinic solvent, C12-C13 isoparaflinic solvent, C12-C16 isoparaffinic solvent, C14-C18 isoparaflinic solvent, C15-C19 isoparaffinic solvent, C10 cycloolefin, mineral oil, mineral spirit, petroleum, alkylbenzene, spindle oil, or derivatives or combinations thereof. A mineral spirit ("white spirit," "petroleum spirit") is a petroleum distillation fraction with a boiling point from about 149° C. to about 204° C., including all intermediate ranges and combinations thereof, and a flash point of 38° C. or greater. A mineral spirit may further be classified as a regular mineral spirit, which possesses the properties previously described for a mineral spirit; a high flash mineral spirit, which possesses a higher minimum flash point (e.g., about 55° C. or greater); a low dry point mineral spirit ("Stoddard solvent"), which typically evaporates 50% faster than a regular mineral spirit; or an odorless mineral spirit, which generally possesses less odor than a regular mineral spirit. In preferred embodiments, the present composition includes a low-odor or odorless mineral spirit. The hydrocarbon solvent is from about 0.1 wt % to about 25 wt %, or from about 1 wt % to about 20 wt %, or from about 2 wt % to about 15 wt %, or from about 3 wt % to about 10 wt %, or from about 4 wt % to about 5 wt %, based on the total weight of the composition.

In some embodiments, the present composition can also include one or more materials that can function as a humectant. A humectant is added to a composition to retard moisture loss during use, which effect is accomplished, in general, by the presence therein of hygroscopic materials.

In some embodiments, the present composition can include additional art-recognized ingredients commonly used. These ingredients can include, for example, antifoaming agents, anti-microbial agents, anti-oxidants, anti-redeposition agents, bleaches, colorants, emulsifiers, enzymes, fats, fluorescent materials, fungicides, hydrotropes, moisturizers, optical brighteners, perfume carriers, perfume, preservatives, proteins, silicones, soil release agents, solubilizers, sugar derivatives, sun screens, vitamins waxes, and the like.

In embodiments, the present composition may optionally include an antioxidant such as reducing agents and free radical scavengers. Suitable materials that can function as an antioxidant can include, for example: acetyl cysteine, ascorbic acid, t-butyl hydroquinone, cysteine, diamylhydroquinone, erythorbic acid, ferulic acid, hydroquinone, p-hydroxyanisole, hydroxylamine sulfate, magnesium ascorbate, magnesium ascorbyl phosphate, octocrylene, phloroglucinol, potassium ascorbyl tocopheryl phosphate, potassium sulfite, rutin, sodium ascorbate, sodium sulfite, sodium thioglycolate, thiodiglycol, thiodiglycolamide, thioglycolic acid, thiosalicylic acid, tocopherol, tocopheryl acetate, tocopheryl linoleate, tris (nonylphenyl)phosphite, and the like, such as ethoxyquin or tertiary butylhydroquinone (TBHQ), and an ultraviolet light absorber such as ethylhexyl methoxycinnamate or benzophenone, or other additives, or combinations thereof.

In some embodiments, the present composition can also include one or more materials that can function as a chelating agent to complex with metallic ions. This action can help to inactivate the metallic ions for the purpose of preventing their adverse effects on the stability or appearance of a formulated composition. Chelating agents suitable for use in an embodiment of this invention can include, for example, aminotrimethylene phosphonic acid, beta-alanine diacetic acid, calcium disodium EDTA, citric acid, cyclodextrin, cyclohexanediamine tetraacetic acid, diammonium citrate, diammonium EDTA, dipotassium EDTA, disodium azacycloheptane diphosphonate, disodium EDTA, disodium pyrophosphate, EDTA (ethylene diamine tetra acetic acid), gluconic acid, HEDTA (hydroxyethyl ethylene diamine triacetic acid), methyl cyclodextrin, pentapotassium triphosphate, pentasodium aminotrimethylene phosphonate, pentasodium triphosphate, pentetic acid, phytic acid, potassium citrate, potassium gluconate, sodium citrate, sodium diethylenetriamine pentamethylene phosphonate, sodium dihydroxyethylglycinate, sodium gluconate, sodium metaphosphate, sodium metasilicate, sodium phytate, triethanolamine ("TEA")-EDTA, TEApolyphosphate, tetrahydroxypropyl ethylenediamine, tetrapotassium pyrophosphate, tetrasodium EDTA, tetrasodium pyrophosphate, tripotassium EDTA, trisodium EDTA, trisodium HEDTA, trisodium phosphate, and the like. The chelating agent of the present RTU composition may be from about 0.01 wt % to about 0.5 wt %, or from about 0.02 wt % to about 0.4 wt %, or from about 0.03 wt % to about 0.3 wt %, or from about 0.04 wt % to about 0.2 wt %, or from about 0.05 wt % to about 0.1 wt %, based on the total weight of the RTU composition.

The present composition may optionally include one or more additional components, including a corrosion inhibitor such as sodium benzoate, a propellant such as nitrogen, butane, isobutane, propane, hydrofluorocarbon, or combinations thereof, a pH adjuster or a buffer such as phosphoric acid, sodium phosphate, or combination thereof, a preservative such as formaldehyde, alkyl esters of p-hydroxybenzoic acid, sodium benzoate, 2-bromo-2-nitropropane-1,3-diol, o-phenylphenol, thiazolinones, benzisothiazolinone, 5-chloro-2-methyl-4-isothiazolin-3-one, 2-methyl-4-isothiazolin-3-one, pentachlorophenol, 2,4-dichlorobenzyl alcohol, or combinations thereof.

The present composition may optionally include one or more agents imparting a pleasant odor thereto (a fragrance agent). Non-limiting examples of fragrance agent or agents imparting a pleasant odor and/or enhancing the pesticidal properties include carvacrol, cymene, cineol, eugenol, thymol, menthol, citral, and limonene. Further suitable examples of such agents are within the capacity of a skilled artisan.

Table 1 shows an exemplary embodiment of the RTU barrier and knockdown pesticide composition according to the present application, wherein lambda cyhalothrin is used as the killing agent, and imiprothrin or prallethrin or both is used as the knockdown agent.

TABLE 1

An exemplary embodiment of the RTU present barrier and knockdown pesticide.

| Ingredient | wt % based on the total weight of the composition |
|---|---|
| Lambda cyhalothrin, $C_{23}H_{19}ClF_3NO_3$ | 0.005-1% |
| Imiprothrin, $C_{17}H_{22}N_2O_4$ | 0-1% |
| Prallethrin, $C_{19}H_{24}O_3$ | 0-1% |
| Tetramethrin, $C_{19}H_{25}NO_4$ | 0-1% |
| Momfluorothrin, $C_{19}H_{19}F_4NO_3$ | 0-1% |
| Piperonyl butoxide (PBO) | 0-5% |
| Sorbitan monooleate (Lubricit™ SMO) | 0.01-10% |
| Ethoxylated C16-C18 alcohols | 0.005-2% |

TABLE 1-continued

An exemplary embodiment of the RTU present barrier and knockdown pesticide.

| Ingredient | wt % based on the total weight of the composition |
|---|---|
| Mineral spirits (Distillates, petroleum, hydrotreated light) | 0.5-10% |
| Light aromatic naphtha | 0.01-1% |
| 1-Butoxy-2-propanol | 0.1-5% |
| Ethylenediaminetetraacetic acid, tetrasodium salt | 0.01-1% |
| Blend of 5-chloro-2-methyl-4-isothiazolin-3-one and 2-methyl-4-isothiazolin-3-one | 0.01-0.5% |
| Phosphoric acid | 0.01-1% |
| Dipotassium phosphate, 50% solution | 0.01-1% |
| Water | Remaining balance |

The present disclosure is also directed to an RTU pesticide product comprising a container and the present RTU barrier and knockdown pesticide composition placed therein. The RTU composition of the present disclosure is sold in a container that will be suitable for storing the composition for its shelf life. Associated with the container is printed instructions and/or a printed label indicating that the subject composition can be used to control pests, i.e., used as a pesticide and providing instructions for using the composition for pesticidal purposes in accordance with the treatment method set forth herein. The container may have associated with it a delivery device that allows the composition to be applied to the pest population or to the area to be treated. For liquid compositions this is generally a hand-operated, motorized or pressurized pressure-driven sprayer. The container may be made of any suitable material such as a polymer, glass, metal, or the like. Usually, the labeling is associated with the container by being adhered to the container, or accompanying the container in a package sold to the user. Such label may indicate that the composition is approved for use as a pesticide. The instructions will spell out the type of pests for which the pesticidal composition is to be used, the application method, the rate of application, dilution requirements, use precautions, and the like.

In some embodiments, the container used in the present RTU pesticide product may be a pressurized aerosol container. When used in an aerosol spray, a propellant may optionally be included in the composition or the container. The propellant can include, but is not limited to, nitrogen, carbon dioxide, nitrous oxide, hydrocarbons, such as propane, n-butane, isobutane, and hydrofluoroalkanes. In preferred embodiments, the container may be a non-aerosol container, such as a trigger spray, a pump-up sprayer, a compression sprayer, a pressurized sprayer, or other spray systems and the like.

Method of use the RTU Composition for Controlling Pests

The present disclosure is also directed to a method for controlling pest. The method comprises applying any of the RTU compositions described herein. In some embodiments, a method for controlling pest comprises applying a RTU barrier and knockdown pesticide composition directly to a target substrate or area, the composition comprising: a killing agent; a knockdown agent; a surface-active agent; and a carrier, wherein the composition is a water-in-oil emulsion.

The RTU compositions of the present disclosure can be used for either indoor or outdoor pest control. The RTU compositions can be used to control pests by either treating a host directly, or treating an area in which the host will be located. The method may comprise treating a target pest or a substrate where a target pest is located by applying the aerosol or trigger spray product containing the RTU barrier and knockdown pesticide composition to the surface of the target pest or the target substrate or the target area. The RTU aerosol or trigger spray product is used for pest control and the target substrates include any indoor or outdoor surfaces such as concrete, vinyl, plywood, ceramic, glass, plastic, or plant surfaces. The target area may include any structural features; premises; residential, commercial, agricultural or industrial structural features; residential, commercial, agricultural or industrial estates; gardens. In preferred embodiments, the method comprises applying spray product containing the RTU barrier and knockdown pesticide composition, wherein the spray product may be a pump spray, a trigger spray, or a pump system or the like, and wherein the spray product is a non-aerosol product, and/or the spray does not form an aerosol.

The present disclosure is also directed to a method for making the present composition and the RTU product thereof. The method may include mixing the components of the RTU composition together by conventional techniques.

The present method may comprise applying the RTU pesticide product containing the barrier and knockdown composition for pest control to at least one member of the group consisting of plants, homes, gardens, indoor areas, outdoor areas, animals, humans, and the combination thereof.

As an exemplary embodiment, the present method for controlling pest comprises applying an RTU barrier and knockdown pesticide composition directly to a target pest or a target substrate or a target area, wherein the composition comprises:

a killing agent, wherein the killing agent is from about 0.01 wt % to about 1 wt %, or from about 0.02 wt % to about 0.8 wt %, or from about 0.03 wt % to about 0.6 wt %, or from about 0.04 wt % to about 0.4 wt %, or from about 0.05 wt % to about 0.2 wt %, or from about 0.06 wt % to about 0.1 wt %;

a knockdown agent, wherein the knockdown agent is from about 0.01 wt % to about 1 wt %, or from about 0.02 wt % to about 0.8 wt %, or from about 0.03 wt % to about 0.6 wt %, or from about 0.04 wt % to about 0.4 wt %, or from about 0.05 wt % to about 0.2 wt %, or from about 0.06 wt % to about 0.1 wt %;

a surface-active agent, wherein the surface-active agent is from 0.005 wt % to about 5 wt %, or from about 0.01 wt % to about 4 wt %, or from about 0.015 wt % to about 3 wt %, or from about 0.02 wt % to about 2 wt %, or from about 0.025 wt % to about 1 wt %, or from about 0.03 wt % to about 0.5 wt %, or from about 0.04 wt % to about 0.25 wt %, or from about 0.05 wt % to about 0.1 wt %;

a carrier, wherein the carrier is from about 0.1 wt % to about 10 wt %, or from about 0.3 wt % to about 8 wt %, or from about 0.5 wt % to about 6 wt %, or from about 0.7 wt % to about 4 wt %, or from about 0.9 wt % to about 2 wt %, or from about 1 wt % to about 1.8 wt %; and water, wherein the composition is a water-in-oil emulsion, and wherein the wt % is based on the total weight of the RTU composition.

In embodiments of the present method, the RTU composition may further comprise a synergist, wherein the synergist is from about 0.05 wt % to about 5 wt %, or from about 0.1 wt % to about 4 wt %, or from about 0.2 wt % to about 3 wt %, or from about 0.3 wt % to about 2 wt %, or from about 0.4 wt % to about 1 wt %, based on the total weight of the RTU composition. In preferred embodiments, the synergist is selected from the group consisting of piperonyl butoxide (PBO), N-octylbicycloheptenedicarboximide, propargyl propyl phenylphosphonate and combinations thereof.

In embodiments of the present method, the RTU composition may further comprise a hydrocarbon solvent, therein the hydrocarbon solvent is from about 0.1 wt % to about 25 wt %, or from about 1 wt % to about 20 wt %, or from about 2 wt % to about 15 wt %, or from about 3 wt % to about 10 wt %, or from about 4 wt % to about 5 wt %, based on the total weight of the composition. In some embodiments, the hydrocarbon solvent comprises a mineral oil, or a mineral spirit, or combinations thereof. Preferably, the hydrocarbon solvent is a light or low-odor or odorless mineral spirit.

In some embodiments of the present method, the RTU composition further includes a thickener, or co-emulsifier, or viscosity regulator/modifier. Preferably, the thickener comprises polyacrylic acid derivatives (carbomer).

In embodiments of the present method, the RTU composition may further comprise a chelating agent, wherein the chelating agent is from about 0.01 wt % to about 0.5 wt %, or from about 0.02 wt % to about 0.4 wt %, or from about 0.03 wt % to about 0.3 wt %, or from about 0.04 wt % to about 0.2 wt %, or from about 0.05 wt % to about 0.1 wt %, based on the total weight of the RTU composition. In some embodiments, the chelating agent is EDTA (ethylene diamine tetra acetic acid) or salts or derivatives thereof.

In some embodiments of the present method, the RTU composition may further comprise a pH adjuster or a buffer such as phosphoric acid, sodium phosphate, or combination thereof, a preservative such as formaldehyde, alkyl esters of p-hydroxybenzoic acid, sodium benzoate, 2-bromo-2-nitropropane-1,3-diol, o-phenylphenol, thiazolinones, benzisothiazolinone, 5-chloro-2-methyl-4-isothiazolin-3-one, 2-methyl-4-isothiazolin-3-one, pentachlorophenol, 2,4-dichlorobenzyl alcohol, or combinations thereof.

In some embodiments of the present method, the killing agent is a natural pyrethrum or synthetic pyrethroid. Preferably, the killing agent is cyhalothrin, more preferably, lambda-cyhalothrin.

In some embodiments of the present method, the knockdown agent is imiprothrin, or prallethrin (ETOC®), or both.

In some embodiments of the present method, the surface-active agent is selected from the group consisting of sorbitan fatty acid ester (Lubricit™ SMO), alkyl alcohol ethoxylate (Alkamuls® AL-CS 20, Alkamuls® AL-CS 25), or mixtures thereof. Preferably, the surface-active agent has a Hydrophil-Lipophil Balance (HLB) value from about 3 to about 9, or from about 4 to about 8, or from about 5 to about 7, or from about 6 to about 7.

In some embodiments of the present method, the carrier comprises from about 0.5% to about 5%, or from about 1% to about 3% or from about 1.5% to about 2% of 1-butoxy-2-propanol.

In some embodiments, the present disclosure relates to a method for controlling pests, wherein the method comprises treating a target pest or a target substrate or a target area with an RTU pesticide product, wherein the RTU pesticide product comprises a container and an RTU barrier and knockdown pesticide composition described herein placed in the container. In some embodiments of the present method, the container is a pressurized aerosol container. In embodiments, the RTU pesticide product further comprises a propellant included in the composition or the container, wherein the propellant is selected from the group consisting of nitrogen, carbon dioxide, nitrous oxide, hydrocarbons, such as propane, n-butane, isobutane, hydrofluoroalkanes, or combinations thereof. In embodiments, applying the RTU product forms an aerosol spray. In other embodiments of the present method, the container is a non-aerosol container, preferably a trigger spray, a pump-up sprayer, a compression sprayer, or a pressurized sprayer, wherein applying the RTU product does not form an aerosol spray.

In some embodiments, the method comprises applying the present RTU pesticide product to a target pest or substrate with a consumer use rate of about 1 to about 10 grams, or from about 2 to about 8 grams, or from about 3 to about 6 grams, or from about 3 to about 5 grams. In some embodiments, the method comprises applying the present RTU pesticide product to a target pest or substrate with a consumer use rate of about 1 to about 10 mL, or from about 2 to about 8 mL, or from about 3 to about 6 mL, or from about 3 to about 5 mL.

EXAMPLES

Certain embodiments of the present disclosure are further described with reference to the following experiments and examples. These experiments, examples, and samples are intended to be merely illustrative of the disclosure and are not intended to limit or restrict the scope of the present disclosure in any way and should not be construed as providing conditions, parameters, reagents, or starting materials that must be utilized exclusively in order to practice the art of the present disclosure.

Table 2 shows various materials used for preparing the RTU barrier and knockdown pesticide composition.

TABLE 2

Chemicals and Materials used and the origination thereof.

| Ingredient | CAS # | Origination |
|---|---|---|
| Lambda cyhalothrin | 91465-08-6/ 64742-95-6 | Makhteshim Agan of North America, Raleigh, NC |
| Imiprothrin | 72963-72-5 | McLaughlin Gormley King, Minneapolis, MN |
| Prallethrin (ETOC ®) | 23031-36-9 (racemic) | McLaughlin Gormley King, Minneapolis, MN |
| Piperonyl butoxide (PBO) | 51-03-6 | McLaughlin Gormley King, Minneapolis, MN |
| Sorbitan monooleate (Lubricit ™ SMO) | 1338-43-8 | Zschimmer & Schwarz, Inc., Milledgeville, GA |
| Mineral spirits (Distillates, petroleum, hydrotreated light) | 64742-47-8 | Chemisphere Co., St. Louis, MO |
| Light aromatic naphtha | 64742-95-6 | Total Petrochemicals & Refining USA, Houston, TX |
| 1-Butoxy-2-propanol (butyl propasol) | 5131-66-8 | Lyondell Chemical Co., Houston TX |
| water | 7732-18-5 | United Industries Corp Earth City, MO |
| Ethylenediaminetetraacetic acid, tetrasodium salt | 64-02-8 | Akzo Nobel Functional Chemicals, LLC, Chicago, IL |
| Methylchloroisothiazolinone (MCI), 5-chloro-2-methyl-4-isothiazolin-3-one | 26172-55-4 | Lanxess Corporation, Pittsburgh, PA |
| Methylisothiazolinone (MIT or MI), 2-methyl-4-isothiazolin-3-one | 2682-20-4 | |
| Phosphoric acid | 7664-38-2 | Brenntag Mid South, Inc., Henderson, KY |
| Dipotassium phosphate | 7758-11-4/ 7732-18-5 | Hawkins, Inc., Roseville, MN |
| Ethoxylated C16-C18 alcohols (ALKAMULS ® AL CS 20, or ALKAMULS ® AL CS 25) | 68439-49-6 | Solvay USA Inc., Princeton, NJ |
| Trigger sprayer | N/A | Silgan Dispensing Systems, Winfield, KS |
| German roach (Order Blattodea: *Blatella germanica*) | N/A | United Industries Corp Insectary, Earth City, MO |
| American cockroaches (Order Blattodea: *Periplaneta americana*) | N/A | United Industries Corp Insectary, Earth City, MO |
| Black widow spiders (Order Araneae: *Latrodectus hesperus*) | N/A | United Industries Corp Insectary, Earth City, MO |
| Standard stainless steel test sieves #10 | N/A | Newark Wire Cloth Co., Clifton, NJ |

Formulation of the RTU Barrier and Knockdown Pesticide Composition

Examples 1-4 compositions each containing lambda cyhalothrin as the killing agent and Imiprothrin as the knockdown agent were respectively prepared according to formulations described in Table 3 using the following procedure. In main beaker was combined mineral spirits, 1-butoxy-2-propanol, sorbitan monooleate, lambda cyhalothrin concentrate solution, and imiprothrin. The mixture was stirred for about 20 minutes using an overhead mixer with paddle blade. In a second beaker was combined water, EDTA, preservative (a blend of 5-chloro-2-methyl-4-isothiazolin-3-one and 2-methyl-4-isothiazolin-3-one), and phosphoric acid, and the aqueous mixture was stirred with a stir bar for about 15 minutes. The aqueous mixture was transferred to a separatory funnel and added dropwise into the main beaker at a medium speed while stirring at 200 rpm. The combined mixtures were further stirred for about 10-15 minutes, yielding an RTU barrier and knockdown pesticide composition. The prepared composition was transferred to a 32 oz F-HDPE bottle with screw cap closure.

TABLE 3

Formulation of Examples 1-4 RTU compositions

| Ingredient | Example 1 wt % based on the total weight of the composition | Example 2 wt % based on the total weight of the composition | Example 3 wt % based on the total weight of the composition | Example 4 wt % based on the total weight of the composition |
|---|---|---|---|---|
| Lambda cyhalothrin, 50 wt % solution | 0.11% (0.0550% of lambda cyhalothrin in the composition) | 0.11% (0.0550% of lambda cyhalothrin in the composition) | 0.11% (0.0550% of lambda cyhalothrin in the composition) | 0.11% (0.0550% of lambda cyhalothrin in the composition) |

TABLE 3-continued

Formulation of Examples 1-4 RTU compositions

| Ingredient | Example 1 wt % based on the total weight of the composition | Example 2 wt % based on the total weight of the composition | Example 3 wt % based on the total weight of the composition | Example 4 wt % based on the total weight of the composition |
|---|---|---|---|---|
| Imiprothrin, 50 wt % solution | 0.0484% (0.0242% of Imiprothrin in the composition) | 0.0678% (0.0339% of Imiprothrin in the composition) | 0.1453% (0.0727% of Imiprothrin in the composition) | 0.1% (0.05% of Imiprothrin in the composition) |
| Sorbitan monooleate (Lubricit™ SMO) | 0.05% | 0.05% | 0.05% | 0.05% |
| Mineral spirits (Distillates, petroleum, hydrotreated light) | 4.5% | 4.5% | 4.5% | 4.5% |
| 1-Butoxy-2-propanol | 1.5% | 1.5% | 1.5% | 1.5% |
| Deionized water | 93.62% | 93.60% | 93.52% | 93.56% |
| Ethylenediaminetetraacetic acid, tetrasodium salt | 0.1% | 0.1% | 0.1% | 0.1% |
| Blend of 5-chloro-2-methyl-4-isothiazolin-3-one and 2-methyl-4-isothiazolin-3-one | 0.04% | 0.04% | 0.04% | 0.04% |
| Phosphoric acid | 0.03% | 0.03% | 0.03% | 0.03% |

Example 5 composition containing lambda cyhalothrin as the killing agent and ETOC as the knockdown agent was prepared according to Table 4 following the similar procedure provided in Examples 1-4.

TABLE 4

Formulation of Examples 5 and 6 RTU composition

| Ingredient | Example 5 wt % based on the total weight of the composition | Example 6 wt % based on the total weight of the composition |
|---|---|---|
| Lambda cyhalothrin, 50 wt % solution | 0.055% | 0.055% |
| Prallethrin (ETOC ®) | 0.05% | 0.05% |
| Piperonyl butoxide (PBO) | 0.5% | None |
| Sorbitan monooleate (Lubricit™ SMO) | 0% | 0.5% |
| Mineral spirits (Distillates, petroleum, hydrotreated light) | 0% | 6.0% |
| 1-Butoxy-2-propanol | 0% | 0% |
| water | 96.05% | 93.15% |
| Ethylenediaminetetraacetic acid, tetrasodium salt | 0.1% | 0.1% |
| Blend of 5-chloro-2-methyl-4-isothiazolin-3-one and 2-methyl-4-isothiazolin-3-one | 0.04% | 0.04% |
| Phosphoric acid | 0.0375% | 0.0375% |

Table 5 shows an exemplary embodiment of a shelf stable RTU barrier and knockdown pesticide composition according to the present application, where a killing agent, such as lambda cyhalothrin is used in combination with a knockdown agent, such as imiprothrin or prallethrin or both is used as the knockdown agent.

TABLE 5

Exemplary embodiments of the RTU present barrier and knockdown pesticide.

| Ingredient | Example 7 | Example 8 | Example 9 | Example 10 | Example 11 | Example 16 | Example 17 |
|---|---|---|---|---|---|---|---|
| killing agent | 0.0566 | 0.0566 | 0.0566 | 0.0566 | 0.0566 | 0.0566 | 0.0566 |
| Knock down agent | 0.0700 | 0.0700 | 0.0700 | 0.0700 | 0.0700 | 0.0700 | 0.0700 |
| Light aromatic naphtha | 0.0534 | 0.0534 | 0.0534 | 0.0534 | 0.0534 | 0.0534 | 0.0534 |
| Surface active agent | 1.9000 | 1.0000 | 1.0000 | 1.9000 | 1.5000 | 1.9000 | 1.7500 |
| hydrocarbon solvent | 9.5000 | 9.5000 | 9.5000 | 18.0000 | 11.2500 | 14.0000 | 11.2500 |
| carrier | 0.5000 | 0.5000 | 0.5000 | 1.0000 | 0.7500 | 1.0000 | 0.7500 |
| Soft water | 87.4121 | 88.3121 | 88.4751 | 78.1746 | 85.7746 | 82.1746 | 85.4246 |
| surface active agent: | 0.1000 | 0.1000 | 0.1000 | 0.5000 | 0.3000 | 0.5000 | 0.4000 |
| pH adjuster or buffer | 0.0504 | 0.0504 | 0.0504 | 0.0504 | 0.0504 | 0.0504 | 0.0504 |
| dipotassium hydrogen phosphate | 0.3175 | 0.3175 | 0.1550 | 0.1550 | 0.1550 | 0.1550 | 0.1550 |
| 1.5% CIT/MIT preservative | 0.0400 | 0.0400 | 0.0400 | 0.0400 | 0.0400 | 0.0400 | 0.0400 |
| Fragrance | 0 | 0 | 0 | 0 | 0 | 0 | 0 |
| pH range | 6.8-7.5 | 6.8-7.5 | 6.0-7.0 | 6.0-7.0 | 6.0-7.0 | 6.0-7.0 | 6.0-7.0 |
| Viscosity range (at room temp.) | 750-850 cps | 300-450 cps | 200-300 cps | 50-110 cps | 100-200 cps | 150-250 cps | 325-425 cps |

In some embodiments of the present method, the composition may optionally include one or more agents imparting a pleasant odor thereto (a fragrance agent). In at least these example embodiments the fragrance is found in an amount from about 0.35% to about 0.5% by weight of the composition. As shown in Table 6, fragrance provides a stable formulation that is shelf stable at room temperature, and thus the emulsion will not separate.

TABLE 6

Exemplary embodiments of the RTU present barrier and knockdown pesticide with fragrance.

| Ingredient | Example 12 | Example 13 | Example 14 | Example 15 |
|---|---|---|---|---|
| killing agent | 0.0566 | 0.0566 | 0.0566 | 0.0566 |
| Knock down agent | 0.0700 | 0.0700 | 0.0700 | 0.0700 |
| Light aromatic naphtha | 0.0534 | 0.0534 | 0.0534 | 0.0534 |
| Surface active agent | 1.0000 | 1.0000 | 1.9000 | 1.5000 |
| hydrocarbon solvent | 9.5000 | 9.5000 | 18.0000 | 11.2500 |
| carrier | 0.5000 | 0.5000 | 1.0000 | 0.7500 |
| Soft water | 87.8121 | 87.9746 | 77.6746 | 85.2746 |
| surface active agent: | 0.1000 | 0.1000 | 0.5000 | 0.3000 |
| pH adjuster or buffer | 0.0504 | 0.0504 | 0.0504 | 0.0504 |
| dipotassium hydrogen phosphate | 0.3175 | 0.1550 | 0.1550 | 0.1550 |
| 1.5% CIT/MIT preservative | 0.0400 | 0.0400 | 0.0400 | 0.0400 |
| Fragrance | 0.5000 | 0.5000 | 0.5000 | 0.5000 |
| pH range | 6.8-7.5 | 6.0-7.0 | 6.0-7.0 | 6.0-7.0 |
| Viscosity range (at room temp.) | 300-450 cps | 200-300 cps | 50-110 cps | 100-200 cps |

As shown in the above formulations the shelf-stable RTU barrier and knockdown pesticide composition provides excellent barrier and knockdown effects. While not wanting to be bound by any particular theory, the formulations described above combined surface active agent is between 0.5 and 2.0% by weight, then the viscosity is greater than 100 cps, whereas when the surface active agent is at or above 2.4% by weight, the viscosity is no more than 250 cps. Table 7 shows various comparative examples that did not provide the shelf stability of the RTU barrier and knockdown formulation when compared to Examples 1-15.

TABLE 7

Comparative examples of RTU barrier and knockdown pesticide formulations.

| Ingredient | Comparative Example 1 | Comparative Example 2 | Comparative Example 3 |
|---|---|---|---|
| Lambda cy. technical (97.1%) | 0.0566 | 0.0566 | 0.0566 |
| Imiprothrin (50%) | 0.0700 | 0.0700 | 0.0700 |
| Light aromatic naptha | 0.0534 | 0.0534 | 0.0534 |
| Sorbitan monooleate | 1.0000 | 1.9000 | 1.9000 |
| Mineral spirits | 18.0000 | 18.0000 | 11.2500 |
| Butyl propasol | 1.0000 | 1.0000 | 0.7500 |
| Soft water | 79.4746 | 78.5747 | 85.1746 |
| Alkamuls AL CS 25 | 0.1000 | 0.1000 | 0.5000 |
| Phosphoric acid | 0.0504 | 0.0504 | 0.0504 |
| DKP (50%) | 0.1550 | 0.1550 | 0.1550 |
| 1.5% CIT/MIT preservative | 0.0400 | 0.0400 | 0.0400 |
| pH range | 6.0-7.0 | 6.0-7.0 | 6.0-7.0 |
| Viscosity range (at room temp.) | 40-100 cps | 25-100 cps | 350-500 cps |

Efficacy Study of the RTU Composition Against German Cockroach

The efficacy of the prepared RTU barrier and knockdown pesticide compositions was investigated. A non-aerosol type trigger sprayer was used to apply the compositions. The parameters of the trigger spray are described in Table 8.

TABLE 8

Attribute details of the sprayer used to evaluate the efficacy of the prepared compositions.

| Component | Value |
|---|---|
| Shroud | Mixor HP |
| Shroud Color | White |
| Value Body | Standard |
| Value Body Color | Natural |
| Closures | 28-400 Non Removable |
| Closures Color | White |
| Discharge Value | Standard |
| Output | 1.6 cc |
| Spacer | Standard |
| Nozzle Configuration/Spray Pattern | 2 Spray/Spray |
| Nozzle | BPD |
| Nozzle Color | White |
| Spin Mechanics | Blue |
| Actuator | Standard |
| Actuator Color | White |
| Spring | Spring-302SS .041 |
| Bail | Colcon |
| Gasket | Standard (0.50) |
| Piston | 1.6 cc |
| Tube Retainer | Standard |
| Tube | Rigid |
| Tube Length | 9" |

Each RTU composition was applied in certain amount respectively to 10 adult *Blattella germanica* German roaches. Knockdown (KD) of the cockroaches was measured in seconds. After 24 hrs. at room temperature, mortality was assessed. The experiments were completed in triplicate. Results were summarized in Tables 9-11.

TABLE 9

Efficacy of Examples 4 and 5 against *Blattella germanica* (German roach)

| Sample | RTU Composition | Mean application weight (g) | Mean time to knockdown (s) | 24 hour mortality (10 roaches total) | |
|---|---|---|---|---|---|
| | | | | Dead | Alive |
| Control (triplicates) | None | N/A | N/A | 0 | 10 |
| 1 (triplicates) | Example 5 (with Prallethrin and PBO) | 4.65 | 28.67 | 10 | 0 |
| 2 (triplicates) | Example 4 (with Imiprothrin) | 4.62 | 7.33 | 10 | 0 |

TABLE 10

Efficacy of Example 6 against *Blattella germanica* (German roach)

| Sample | Composition | Mean application weight (g) | Mean time to knockdown (s) | 24 hour mortality (10 roaches total) | |
|---|---|---|---|---|---|
| | | | | Dead | Alive |
| Control (triplicates) | None | N/A | N/A | 0 | 10 |

TABLE 10-continued

Efficacy of Example 6 against *Blattella germanica* (German roach)

| Sample | Composition | Mean application weight (g) | Mean time to knockdown (s) | 24 hour mortality (10 roaches total) | |
|---|---|---|---|---|---|
| | | | | Dead | Alive |
| 3 (triplicates) | Example 6 (with Imiprothrin) | 4.46 | 12.33 | 10 | 0 |
| 4 (triplicates) | Example 6 (with Imiprothrin) | 4.09 | 14.00 | 10 | 0 |
| 5 (triplicates) | Example 6 (with Imiprothrin) | 3.84 | 16.00 | 10 | 0 |

TABLE 11

Efficacy of Examples 1-3 against *Blattella germanica* (German roach)

| Sample | Composition | Mean application weight (g) | Mean time to knockdown (s) | 24 hour mortality (10 roaches total) | |
|---|---|---|---|---|---|
| | | | | Dead | Alive |
| Control (triplicates) | None | N/A | N/A | 0 | 10 |
| 6 (triplicates) | Example 1 (with imiprothrin) | 4.80 | 9.00 | 10 | 0 |
| 7 (triplicates) | Example 2 (with imiprothrin) | 4.90 | 7.33 | 10 | 0 |
| 8 (triplicates) | Example 3 (with imiprothrin) | 4.82 | 8.67 | 10 | 0 |

It was surprisingly found that Example 5 (the RTU composition with 0.055% lambda-cyhalothrin as the killing agent, 0.05% prallethrin as the knockdown agent, and 0.5% PBO as the synergist) had an average time of 28.67 seconds to knockdown the target cockroaches, and all 10 cockroaches were killed within 24 hours. Example 4 (with 0.055% lambda-cyhalothrin as the killing agent and 0.05% imiprothrin as the knockdown agent) was found to knock down the cockroaches in only about 7.33 seconds, at similar dosage as Example 5. These results showed the unexpected knockdown efficiency and barrier performance of the present RTU compositions.

A Comparative Study of the Present RTU Composition

A comparative study was conducted to further prove the efficacy of the knockdown agent of present RTU barrier and knockdown pesticide composition. Examples 16 and 17 both having 0.055% Lambda cyhalothrin as the killing agent and 0.035% Imiprothrin as the knockdown agent were prepared. Comparative example 1 having the exact same formulation as Example 7 except for Imiprothrin was prepared and used to compare with Examples 16 and 17 in the study. Comparative example 1 thus has only 0.055% Lambda cyhalothrin as the killing agent but no knockdown agent. Formulations for Examples 7 and 8 and Comparative example 1 were summarized in Table 12. The samples were tested against three adult organisms separately, including German cockroaches (Order Blattodea: *Blatella germanica*), American cockroaches (Order Biattodea: *Periplaneta americana*), and Black widow spiders (Order Araneae: *Latrodectus hesperus*).

TABLE 12

Formulation of Examples 16-17 and Comparative Example 4.

| Ingredient | Example 16 wt % based on the total weight of the composition | Example 17 wt % based on the total weight of the composition | Comparative example 4 wt % based on the total weight of the composition |
|---|---|---|---|
| Lambda cyhalothrin | 0.055 | 0.055 | 0.055 |
| Imiprothrin | 0.035 | 0.035 | None |
| Sorbitan monooleate (Lubricit ™ SMO) | 0.25 | 1.9 | 1.9 |
| Alkamuls AL CS 25 | None | 0.1 | None |
| Mineral spirits (Distillates, petroleum, hydrotreated light) | 4.5 | 9.5 | 4.5 |
| 1-Butoxy-2-propanol | 1.5 | 0.5 | 1.5 |
| Deionized water | 93.44 | 87.45 | 93.8 |
| Blend of 5-chloro-2-methyl-4-isothiazolin-3-one and 2-methyl-4-isothiazolin-3-one | 0.04 | 0.04 | 0.04 |
| Phosphoric acid | 0.07 | 0.05 | 0.07 |
| Dipotassium phosphate | 0.06 | 0.3175 | 0.06 |
| Total (%) | 100 | 100 | 100 |

The general test procedure is described herein. Each composition sample was shaken thoroughly and pre-sprayed to clear the dip tube of the spray system, and a spray pattern and a delivery rate were determined. Black widow spiders were tested 1 per replicate, with the same number of untreated controls held to complete a balanced design. Roaches were tested in groups of 10 per replicate, with the same number of untreated controls held to complete a balanced design. Prior to treatment, the organisms were lightly anesthetized by $CO_2$ gas and transferred to the test chamber. The organisms were allowed to recover and then treated with a typical consumer use rate of approximately 3 to 5 grams of the sample. The weight (g) of each application was recorded. After treatment, knockdown time KD90 (inability to move in a consistent manner) was determined using a stopwatch, and the organisms were then transferred to clean holding containers. All of the organisms were given approximately 0.5 grams of Fluker Farms "Orange Cube" as a water/food source. Mortality in %Kill was rated at 24 hours. Table 13 shows the comparison of Examples 16-17 and Comparative example 4.

TABLE 13

Efficacy of Example 2 and Comparative example 4 against organisms.

| Organism | Treatment | Average Wt. (g) | Average KD90 (s) | Average % Kill |
|---|---|---|---|---|
| German cockroach | Comparative example 4 | | 81.0 | 100 24 H |
| | Example 16 | 4.64 | 8.3 | 100 24 H |
| | Example 17 | 4.46 | 7.1 | 100 24 H |
| American cockroach | Comparative example 4 | | >6000 | 100 24 H |
| | Example 16 | 4.64 | 18.5 | 100 24 H |
| | Example 17 | 4.67 | 19.5 | 100 24 H |
| Black widow spider | Comparative example 4 | | 198.0 | 100 24 H |
| | Example 16 | 4.41 | 6.7 | 100 24 H |
| | Example 17 | 4.26 | 7.3 | 100 24 H |

As shown in Tables 12-13, it was surprisingly found that Examples 16-17 having both killing agent and knockdown agent showed significantly higher efficacy in knocking down all three organisms, when compared with Comparative example 4. In particular, adult American cockroaches treated with Examples 16-17 were found to be knocked down within 20 seconds, while Comparative example 1 without a knockdown agent failed to knock down American cockroaches within 10 min. These unexpected results proved the advantages of the present barrier and knockdown compositions in providing customers an immediate indication of the pesticidal effect in seconds and a satisfied efficiency in ultimately killing the treated pests. The above specification, examples and data provide a complete description of the manufacture and use of the composition of the disclosure. Since many embodiments of the disclosure can be made without departing from the spirit and scope of the disclosure, the disclosure resides in the claims hereinafter appended.

Numbered Clauses

The following numbered clauses define further example aspects and features of the compositions, methods, and techniques of the present disclosure:

1. A ready-to-use barrier and knockdown pesticide composition, comprising:
   a killing agent;
   a knockdown agent;
   a surface-active agent; and
   a carrier;
   wherein, the composition is a water-in-oil emulsion.
2. The composition of clause 1, wherein the killing agent is from about 0.01 wt % to about 1 wt %, or from about 0.02 wt % to about 0.8 wt %, or from about 0.03 wt % to about 0.6 wt %, or from about 0.04 wt % to about 0.4 wt %, or from about 0.05 wt % to about 0.2 wt %, or from about 0.06 wt % to about 0.1 wt %, based on the total weight of the composition.
3. The composition of any one of clauses 1 and 2, wherein the surface-active agent is from about 0.005 wt % to about 5 wt %, or from about 0.01 wt % to about 4 wt %, or from about 0.015 wt % to about 3 wt %, or from about 0.02 wt % to about 2 wt %, or from about 0.025 wt % to about 1 wt %, or from about 0.03 wt % to about 0.5 wt %, or from about 0.04 wt % to about 0.25 wt %, or from about 0.05 wt % to about 0.1 wt %, based on the total weight of the composition.
4. The composition of any one of clauses 1 to 3, further comprising a synergist selected from the group consisting of piperonyl butoxide (PBO), N-octylbicyclo-heptenedicarboximide, propargyl propyl phenylphosphonate, and combinations thereof.
5. The composition of clause 4, wherein the synergist is from about 0.05 wt % to about 5 wt %, or from about 0.1 wt % to about 4 wt %, or from about 0.2 wt % to about 3 wt %, or from about 0.3 wt % to about 2 wt %, or from about 0.4 wt % to about 1 wt %, based on the total weight of the composition.
6. The composition of any one of clauses 1 to 5, wherein the carrier is from about 0.1 wt % to about 10 wt %, or from about 0.3 wt % to about 8 wt %, or from about 0.5 wt % to about 6 wt %, or from about 0.7 wt % to about 4 wt %, or from about 0.9 wt % to about 2 wt %, or from about 1 wt % to about 1.8 wt %, based on the total weight of the composition.
7. The composition of any one of clauses 1 to 6, further comprising a hydrocarbon solvent selected from the group consisting of vegetable oil, mineral oil, mineral spirit, petroleum, alkylbenzene, spindle oil, or derivatives or combinations thereof.
8. The composition of clause 7, wherein the hydrocarbon solvent is from about 0.1 wt % to about 25 wt %, or from about 1 wt % to about 20 wt %, or from about 2 wt % to about 15 wt %, or from about 3 wt % to about 10 wt %, or from about 4 wt % to about 5 wt %, based on the total weight of the composition.
9. The composition of any one of clauses 1 to 8, further comprising a thickener selected from the group consisting of cellulose derivatives, polyacrylic acid derivatives (carbomer), xanthan gum, modified clays, finely divided silica, or combinations thereof.
10. The composition of any one of clauses 1 to 9, further comprising a chelating agent, wherein the chelating agent is from about 0.01 wt % to about 0.5 wt %, or from about 0.02 wt % to about 0.4 wt %, or from about 0.03 wt % to about 0.3 wt %, or from about 0.04 wt % to about 0.2 wt %, or from about 0.05 wt % to about 0.1 wt %, based on the total weight of the composition.
11. The composition of any one of clauses 1 to 10, further comprising an effective amount of pH adjuster.
12. The composition of any one of clauses 1 to 11, further comprising an effective amount of a preservative selected from the group consisting of formaldehyde, alkyl esters of p-hydroxybenzoic acid, sodium benzoate, 2-bromo-2-nitropropane-1,3-diol, o-phenylphenol, thiazolinones, benzisothiazolinone, 5-chloro-2-methyl-4-isothiazolin-3-one, 2-methyl-4-isothiazolin-3-one, pentachlorophenol, 2,4-dichlorobenzyl alcohol, or combinations thereof.
13. The composition of any one of clauses 1 to 12, wherein the killing agent is a natural pyrethrum or synthetic pyrethroid.
14. The composition of any one of clauses 1 to 13, wherein the killing agent is selected from the group consisting of permethrin, deltamethrin, bifenthrin, fluvalinate, fenvalerate, esfenvalerate, lambda cyhalothrin, tetramethrin, cyfluthrin, resmethrin, allethrin, bioallethrin, esbiothrin, s-bioallethrin (ESBIOL®), d-allethrin; cypermethrin; zeta cypermethrin, tau fluvalinate, channel blocking insecticide, acetylcholinesterase inhibitor, oxadiazines; organophosphate, chlorpyriphos, acephate, neonicotinoid insecticide, thiamethoxam, imidacloprid, acetamiprid, thiacloprid, clothianidin, nitenpyram, insect growth regulator, teflubenzuron, flufenoxuron, bistrifluoron, hexaflumuron; juvenile hormone mimic such as pyriproxyfen, methoprene and fenoxycarb, fermentation insecticide such as abamectin, spiromesifen, spinosad, and *Bacillus thuringiensis,* plant oil insecticide such as cinnamon, rosemary, wintergreen, citrus and clove oils, acaricide, miticide, fungicide, herbicide and combinations thereof.
15. The composition of any one of clauses 1 to 14, wherein the knockdown agent is selected from the group consisting of tetramethrin, imiprothrin, prallethrin (ETOC®), momfluorothrin (SUMIFREEZE®), and combinations thereof.
16. The composition of any one of clauses 1 to 15, wherein the surface-active agent is selected from the group consisting of fatty acid ester, sorbitan fatty acid ester (Lubricit™ SMO), alkyl alcohol ethoxylate (Alkamuls® AL-CS 20, Alkamuls® AL-CS 25), or combinations thereof.

17. The composition of any one of clauses 1 to 16, wherein the surface-active agent has a Hydrophil-Lipophil Balance (HLB) value from about 3 to about 9, or from about 4 to about 8, or from about 5 to about 7.
18. The composition of any one of clauses 1 to 17, wherein the killing agent is lambda cyhalothrin.
19. The composition of any one of clauses 1 to 18, wherein the knockdown agent is imiprothrin, or prallethrin (ETOC®), or both.
20. The composition of any one of clauses 1 to 19, wherein the carrier is a liquid solvent selected from the group consisting of aromatics, chlorinated aromatics, alcohol, glycol ether, glycol ester, ketone, dimethyformamide, dimethyl sulphoxide, water, or combinations thereof.
21. A method for controlling pest comprising applying a ready-to-use barrier and knockdown pesticide composition directly to a target pest or to a target substrate or a target area, the composition comprising:
a killing agent;
a knockdown agent;
a surface-active agent; and
a carrier,
wherein the composition is a water-in-oil emulsion.
22. The method of clause 21, wherein the composition further comprises a synergist selected from the group consisting of piperonyl butoxide (PBO), N-octylbicycloheptenedicarboximide, propargyl propyl phenylphosphonate, and combinations thereof.
23. The method of any one of clauses 21 to 22, wherein the composition further comprises a hydrocarbon solvent selected from the group consisting of vegetable oil, mineral oil, mineral spirit, petroleum, alkylbenzene, spindle oil, or derivatives or combinations thereof.
24. The method of any one of clauses 21 to 23, wherein the composition further comprises a thickener selected from the group consisting of cellulose derivatives, polyacrylic acid derivatives (carbomer), xanthan gum, modified clays, finely divided silica, or combinations thereof.
25. The method of any one of clauses 21 to 24, wherein the composition further comprises a chelating agent, a pH adjuster, a preservative, or combinations thereof.
26. The method of any one of clauses 21 to 25, wherein the killing agent is a natural pyrethrum or synthetic pyrethroid.
27. The method of any one of clauses 21 to 26, wherein the killing agent is lambda cyhalothrin.
28. The method of any one of clauses 21 to 27, wherein the knockdown agent is imiprothrin, or prallethrin (ETOC®), or both.
29. The method of any one of clause 21 to 28, wherein the composition is directly sprayed onto the target pest or the target substrate or the target area in a non-aerosol form.
30. A ready-to-use barrier and knockdown pesticide composition, comprising:
a killing agent;
a knockdown agent;
a surface-active agent; and
a carrier;
wherein, the composition is a water-in-oil emulsion and wherein the surface active agent is between 0.005% and 2.0% by weight and wherein the viscosity of the ready-to-use barrier and knockdown pesticide composition is greater than 100 cps at room temperature.
31. The composition of clause 30, wherein the killing agent is from about 0.01 wt % to about 1 wt %, or from about 0.02 wt % to about 0.8 wt %, or from about 0.03 wt % to about 0.6 wt %, or from about 0.04 wt % to about 0.4 wt %, or from about 0.05 wt % to about 0.2 wt %, or from about 0.06 wt % to about 0.1 wt %, based on the total weight of the composition.
32. The composition of any one of clauses 30 and 31, wherein the surface-active agent is from about 0.005 wt % to about 2.0 wt %, or from about 0.01 wt % to about 2.0 wt %, or from about 0.015 wt % to about 2 wt %, or from about 0.02 wt % to about 2.0 wt %, or from about 0.025 wt % to about 2.0 wt %, or from about 0.03 wt % to about 2.0 wt %, or from about 0.04 wt % to about 2.0 wt %, or from about 0.05 wt % to about 0.1 wt %, based on the total weight of the composition.
33. The composition of any one of clauses 30 to 33, further comprising a synergist selected from the group consisting of piperonyl butoxide (PBO), N-octylbicycloheptenedicarboximide, propargyl propyl phenylphosphonate, and combinations thereof.
34. The composition of clause 33, wherein the synergist is from about 0.05 wt % to about 5 wt %, or from about 0.1 wt % to about 4 wt %, or from about 0.2 wt % to about 3 wt %, or from about 0.3 wt % to about 2 wt %, or from about 0.4 wt % to about 1 wt %, based on the total weight of the composition.
35. The composition of any one of clauses 30 to 34, wherein the carrier is from about 0.1 wt % to about 10 wt %, or from about 0.3 wt % to about 8 wt %, or from about 0.5 wt % to about 6 wt %, or from about 0.7 wt % to about 4 wt %, or from about 0.9 wt % to about 2 wt %, or from about 1 wt % to about 1.8 wt %, based on the total weight of the composition.
36. The composition of any one of clauses 30 to 35, further comprising a hydrocarbon solvent selected from the group consisting of vegetable oil, mineral oil, mineral spirit, petroleum, alkylbenzene, spindle oil, or derivatives or combinations thereof.
37. The composition of clause 36, wherein the hydrocarbon solvent is from about 0.1 wt % to about 25 wt %, or from about 1 wt % to about 20 wt %, or from about 2 wt % to about 15 wt %, or from about 3 wt % to about 10 wt %, or from about 4 wt % to about 5 wt %, based on the total weight of the composition.
38. The composition of any one of clauses 30 to 37, further comprising a thickener selected from the group consisting of cellulose derivatives, polyacrylic acid derivatives (carbomer), xanthan gum, modified clays, finely divided silica, or combinations thereof.
39. The composition of any one of clauses 30 to 38, further comprising a chelating agent, wherein the chelating agent is from about 0.01 wt % to about 0.5 wt %, or from about 0.02 wt % to about 0.4 wt %, or from about 0.03 wt % to about 0.3 wt %, or from about 0.04 wt % to about 0.2 wt %, or from about 0.05 wt % to about 0.1 wt %, based on the total weight of the composition.
40. The composition of any one of clauses 30 to 39, further comprising an effective amount of pH adjuster.
41. The composition of any one of clauses 30 to 40, further comprising an effective amount of a preservative selected from the group consisting of formaldehyde, alkyl esters of p-hydroxybenzoic acid, sodium benzoate, 2-bromo-2-nitropropane-1,3-diol, o-phenylphenol, thiazolinones, benzisothiazolinone, 5-chloro-2-methyl-4-isothiazolin-3-one, 2-methyl isothiazolin-3-one, pentachlorophenol, 2,4-dichlorobenzyl alcohol, or combinations thereof.

42. The composition of any one of clauses 30 to 41, wherein the killing agent is a natural pyrethrum or synthetic pyrethroid.

43. The composition of any one of clauses 30 to 42, wherein the killing agent is selected from the group consisting of permethrin, deltamethrin, bifenthrin, fluvalinate, fenvalerate, esfenvalerate, lambda cyhalothrin, tetramethrin, cyfluthrin, resmethrin, allethrin, bioallethrin, esbiothrin, s-bioallethrin (ESBIOL®), d-allethrin; cypermethrin; zeta cypermethrin, tau fluvalinate, channel blocking insecticide, acetylcholinesterase inhibitor, oxadiazines; organophosphate, chlorpyriphos, acephate, neonicotinoid insecticide, thiamethoxam, imidacloprid, acetamiprid, thiacloprid, clothianidin, nitenpyram, insect growth regulator, teflubenzuron, flufenoxuron, bistrifluoron, hexaflumuron; juvenile hormone mimic such as pyriproxyfen, methoprene and fenoxycarb, fermentation insecticide such as abamectin, spiromesifen, spinosad, and Bacillus thuringiensis, plant oil insecticide such as cinnamon, rosemary, wintergreen, citrus and clove oils, acaricide, miticide, fungicide, herbicide and combinations thereof.

44. The composition of any one of clauses 30 to 43, wherein the knockdown agent is selected from the group consisting of tetramethrin, imiprothrin, prallethrin (ETOC®), momfluorothrin (SUMIFREEZE®), and combinations thereof.

45. The composition of any one of clauses 30 to 44, wherein the surface-active agent is selected from the group consisting of fatty acid ester, sorbitan fatty acid ester (Lubricit™ SMO), alkyl alcohol ethoxylate (Alkamuls® AL-CS 20, Alkamuls® AL-CS 25), or combinations thereof.

46. The composition of any one of clauses 30 to 45, wherein the surface-active agent has a Hydrophil-Lipophil Balance (HLB) value from about 3 to about 9, or from about 4 to about 8, or from about 5 to about 7.

47. The composition of any one of clauses 30 to 46, wherein the killing agent is lambda cyhalothrin.

48. The composition of any one of clauses 30 to 47, wherein the knockdown agent is imiprothrin, or prallethrin (ETOC®), or both.

49. The composition of any one of clauses 30 to 48, wherein the carrier is a liquid solvent selected from the group consisting of aromatics, chlorinated aromatics, alcohol, glycol ether, glycol ester, ketone, dimethyformamide, dimethyl sulphoxide, water, or combinations thereof.

50. A method for controlling pest comprising applying a ready-to-use barrier and knockdown pesticide composition directly to a target pest or to a target substrate or a target area, the composition comprising:
a killing agent;
a knockdown agent;
a surface-active agent; and
a carrier,
wherein, the composition is a water-in-oil emulsion and wherein the surface active agent is between 0.5% and 2.0% by weight and wherein the viscosity of the ready-to-use barrier and knockdown pesticide composition is greater than 100 cps at room temperature.

51. The method of clause 50, wherein the composition further comprises a synergist selected from the group consisting of piperonyl butoxide (PBO), N-octylbicycloheptenedicarboximide, propargyl propyl phenylphosphonate, and combinations thereof.

52. The method of any one of clauses 50 to 51, wherein the composition further comprises a hydrocarbon solvent selected from the group consisting of vegetable oil, mineral oil, mineral spirit, petroleum, alkylbenzene, spindle oil, or derivatives or combinations thereof.

53. The method of any one of clauses 50 to 52, wherein the composition further comprises a thickener selected from the group consisting of cellulose derivatives, polyacrylic acid derivatives (carbomer), xanthan gum, modified clays, finely divided silica, or combinations thereof.

54. The method of any one of clauses 50 to 53, wherein the composition further comprises a chelating agent, a pH adjuster, a preservative, or combinations thereof.

55. The method of any one of clauses 50 to 54, wherein the killing agent is a natural pyrethrum or synthetic pyrethroid.

56. The method of any one of clauses 50 to 55, wherein the killing agent is lambda cyhalothrin.

57. The method of any one of clauses 50 to 56, wherein the knockdown agent is imiprothrin, or prallethrin (ETOC®), or both.

58. The method of any one of clause 50 to 57, wherein the composition is directly sprayed onto the target pest or the target substrate or the target area in a non-aerosol form.

59. A ready-to-use barrier and knockdown pesticide composition, comprising:
a killing agent;
a knockdown agent;
a surface-active agent; and
a carrier;
wherein, the composition is a water-in-oil emulsion and wherein the surface active agent is at or above 2.4% by weight and wherein the viscosity of the ready-to-use barrier and knockdown pesticide composition at room temperature is no more than 250 cps.

60. The composition of clause 59, wherein the killing agent is from about 0.01 wt % to about 1 wt %, or from about 0.02 wt % to about 0.8 wt %, or from about 0.03 wt % to about 0.6 wt %, or from about 0.04 wt % to about 0.4 wt %, or from about 0.05 wt % to about 0.2 wt %, or from about 0.06 wt % to about 0.1 wt %, based on the total weight of the composition.

61. The composition of any one of clauses 59 and 60, wherein the surface-active agent is from about 2.4 wt % to about 5 wt %, or from about 2.4 wt % to about 4 wt %, or from about 2.4 wt % to about 3 wt %, based on the total weight of the composition.

62. The composition of any one of clauses 59 to 61, further comprising a synergist selected from the group consisting of piperonyl butoxide (PBO), N-octylbicycloheptenedicarboximide, propargyl propyl phenylphosphonate, and combinations thereof.

63. The composition of clause 62, wherein the synergist is from about 0.05 wt % to about 5 wt %, or from about 0.1 wt % to about 4 wt %, or from about 0.2 wt % to about 3 wt %, or from about 0.3 wt % to about 2 wt %, or from about 0.4 wt % to about 1 wt %, based on the total weight of the composition.

64. The composition of any one of clauses 59 to 63, wherein the carrier is from about 0.1 wt % to about 10 wt %, or from about 0.3 wt % to about 8 wt %, or from about 0.5 wt % to about 6 wt %, or from about 0.7 wt % to about 4 wt %, or from about 0.9 wt % to about 2 wt %, or from about 1 wt % to about 1.8 wt %, based on the total weight of the composition.
65. The composition of any one of clauses 59 to 64, further comprising a hydrocarbon solvent selected from the group consisting of vegetable oil, mineral oil, mineral spirit, petroleum, alkylbenzene, spindle oil, or derivatives or combinations thereof.
66. The composition of clause 65, wherein the hydrocarbon solvent is from about 0.1 wt % to about 25 wt %, or from about 1 wt % to about 20 wt %, or from about 2 wt % to about 15 wt %, or from about 3 wt % to about 10 wt %, or from about 4 wt % to about 5 wt %, based on the total weight of the composition.
67. The composition of any one of clauses 59 to 66, further comprising a thickener selected from the group consisting of cellulose derivatives, polyacrylic acid derivatives (carbomer), xanthan gum, modified clays, finely divided silica, or combinations thereof.
68. The composition of any one of clauses 59 to 67, further comprising a chelating agent, wherein the chelating agent is from about 0.01 wt % to about 0.5 wt %, or from about 0.02 wt % to about 0.4 wt %, or from about 0.03 wt % to about 0.3 wt %, or from about 0.04 wt % to about 0.2 wt %, or from about 0.05 wt % to about 0.1 wt %, based on the total weight of the composition.
69. The composition of any one of clauses 59 to 68, further comprising an effective amount of pH adjuster.
70. The composition of any one of clauses 59 to 69, further comprising an effective amount of a preservative selected from the group consisting of formaldehyde, alkyl esters of p-hydroxybenzoic acid, sodium benzoate, 2-bromo-2-nitropropane-1,3-diol, o-phenylphenol, thiazolinones, benzisothiazolinone, 5-chloro-2-methyl-4-isothiazolin-3-one, 2-methyl-4-isothiazolin-3-one, pentachlorophenol, 2,4-dichlorobenzyl alcohol, or combinations thereof.
71. The composition of any one of clauses 59 to 70, wherein the killing agent is a natural pyrethrum or synthetic pyrethroid.
72. The composition of any one of clauses 59 to 71, wherein the killing agent is selected from the group consisting of permethrin, deltamethrin, bifenthrin, fluvalinate, fenvalerate, esfenvalerate, lambda cyhalothrin, tetramethrin, cyfluthrin, resmethrin, allethrin, bioallethrin, esbiothrin, s-bioallethrin (ESBIOL®), d-allethrin; cypermethrin; zeta cypermethrin, tau fluvalinate, channel blocking insecticide, acetylcholinesterase inhibitor, oxadiazines; organophosphate, chlorpyriphos, acephate, neonicotinoid insecticide, thiamethoxam, imidacloprid, acetamiprid, thiacloprid, clothianidin, nitenpyram, insect growth regulator, teflubenzuron, flufenoxuron, bistrifluoron, hexaflumuron; juvenile hormone mimic such as pyriproxyfen, methoprene and fenoxycarb, fermentation insecticide such as abamectin, spiromesifen, spinosad, and Bacillus thuringiensis, plant oil insecticide such as cinnamon, rosemary, wintergreen, citrus and clove oils, acaricide, miticide, fungicide, herbicide and combinations thereof.
73. The composition of any one of clauses 59 to 72, wherein the knockdown agent is selected from the group consisting of tetramethrin, imiprothrin, prallethrin (ETOC®), momfluorothrin (SUMIFREEZE®), and combinations thereof.
74. The composition of any one of clauses 59 to 73, wherein the surface-active agent is selected from the group consisting of fatty acid ester, sorbitan fatty acid ester (Lubricit™ SMO), alkyl alcohol ethoxylate (Alkamuls® AL-CS 20, Alkamuls® AL-CS 25), or combinations thereof.
75. The composition of any one of clauses 59 to 74, wherein the surface-active agent has a Hydrophil-Lipophil Balance (HLB) value from about 3 to about 9, or from about 4 to about 8, or from about 5 to about 7.
76. The composition of any one of clauses 59 to 75, wherein the killing agent is lambda cyhalothrin.
77. The composition of any one of clauses 59 to 76, wherein the knockdown agent is imiprothrin, or prallethrin (ETOC®), or both.
78. The composition of any one of clauses 59 to 77, wherein the carrier is a liquid solvent selected from the group consisting of aromatics, chlorinated aromatics, alcohol, glycol ether, glycol ester, ketone, dimethyformamide, dimethyl sulphoxide, water, or combinations thereof.
79. A method for controlling pest comprising applying a ready-to-use barrier and knockdown pesticide composition directly to a target pest or to a target substrate or a target area, the composition comprising:
a killing agent;
a knockdown agent;
a surface-active agent; and
a carrier,
wherein, the composition is a water-in-oil emulsion and wherein the surface active agent is at or above 2.4% by weight and wherein the viscosity of the ready-to-use barrier and knockdown pesticide composition at room temperature is no more than 250 cps.
80. The method of clause 79, wherein the composition further comprises a synergist selected from the group consisting of piperonyl butoxide (PBO), N-octylbicycloheptenedicarboximide, propargyl propyl phenylphosphonate, and combinations thereof.
81. The method of any one of clauses 79 to 80, wherein the composition further comprises a hydrocarbon solvent selected from the group consisting of vegetable oil, mineral oil, mineral spirit, petroleum, alkylbenzene, spindle oil, or derivatives or combinations thereof.
82. The method of any one of clauses 79 to 81, wherein the composition further comprises a thickener selected from the group consisting of cellulose derivatives, polyacrylic acid derivatives (carbomer), xanthan gum, modified clays, finely divided silica, or combinations thereof.
83. The method of any one of clauses 79 to 82, wherein the composition further comprises a chelating agent, a pH adjuster, a preservative, or combinations thereof.
84. The method of any one of clauses 79 to 83, wherein the killing agent is a natural pyrethrum or synthetic pyrethroid.
85. The method of any one of clauses 79 to 84, wherein the killing agent is lambda cyhalothrin.
86. The method of any one of clauses 79 to 85, wherein the knockdown agent is imiprothrin, or prallethrin (ETOC®), or both.
87. The method of any one of clause 79 to 86, wherein the composition is directly sprayed onto the target pest or the target substrate or the target area in a non-aerosol form.

Although only exemplary embodiments of the present disclosure have been described in detail above, those skilled in the art will readily appreciate that many modifications are possible without materially departing from the novel teachings and advantages of this invention.

Accordingly, all such modifications are intended to be included within the scope of this disclosure as defined in the following claims.

The invention claimed is:

1. A ready-to-use barrier and knockdown pesticide composition, comprising:
a killing agent selected from the group consisting of natural pyrethrum, a synthetic pyrethroid, and combinations thereof;
a knockdown agent selected from the group consisting of tetramethrin, imiprothrin, prallethrin, momfluorothrin, and combinations thereof;
a surface-active agent having an HLB value of about 3 to about 5; and
about 85 wt. % to about 97 wt. % water;
wherein, the composition is an emulsion.

2. The composition of claim 1, wherein the killing agent is from about 0.01 wt % to about 1 wt %, based on the total weight of the composition.

3. The composition of claim 1, wherein the surface-active agent is from about 0.005 wt % to about 2.0 wt %, based on the total weight of the composition.

4. The composition of claim 1, further comprising a synergist selected from the group consisting of piperonyl butoxide (PBO), N-octylbicycloheptenedicarboximide, propargyl propyl phenylphosphonate, and combinations thereof.

5. The composition of claim 4, wherein the synergist is from about 0.05 wt % to about 5 wt %, based on the total weight of the composition.

6. The composition of claim 1, further comprising a hydrocarbon solvent selected from the group consisting of vegetable oil, mineral oil, mineral spirit, petroleum, alkylbenzene, spindle oil, or derivatives or combinations thereof.

7. The composition of claim 6, wherein the hydrocarbon solvent is from about 0.1 wt % to about 25 wt %, based on the total weight of the composition.

8. The composition of claim 1, further comprising a thickener selected from the group consisting of cellulose derivatives, polyacrylic acid derivatives (carbomer), xanthan gum, modified clays, finely divided silica, or combinations thereof.

9. The composition of claim 1, further comprising a chelating agent, wherein the chelating agent is from about 0.01 wt % to about 0.5 wt %, based on the total weight of the composition.

10. The composition of claim 1, wherein the killing agent is selected from the group consisting of permethrin, deltamethrin, bifenthrin, fluvalinate, fenvalerate, esfenvalerate, lambda cyhalothrin, tetramethrin, cyfluthrin, resmethrin, allethrin, bioallethrin, esbiothrin, s-bioallethrin (ESBIOL®), d-allethrin; cypermethrin; zeta cypermethrin, tau fluvalinate, and combinations thereof.

11. The composition of claim 1, wherein the surface active agent is at or above 2.4% by weight and wherein the viscosity of the ready-to-use barrier and knockdown pesticide composition at room temperature is no more than 250 cps.

12. The composition of claim 1, wherein the surface active agent is between 0.5% and 2.0% by weight and wherein the viscosity of the ready-to-use barrier and knockdown pesticide composition is greater than 100 cps at room temperature.

13. A method for controlling pest comprising applying a ready-to-use barrier and knockdown pesticide composition directly to a target pest or to a target substrate or a target area, the composition comprising:
a killing agent selected from the group consisting of natural pyrethrum, a synthetic pyrethroid, and combinations thereof;
a knockdown agent selected from the group consisting of tetramethrin, imiprothrin, prallethrin, momfluorothrin, and combinations thereof;
a surface-active agent having an HLB value of about 3 to about 5; and
about 85 wt. % to about 97 wt. % water,
wherein the composition is an emulsion.

14. The method of claim 13, wherein the composition further comprises a synergist selected from the group consisting of piperonyl butoxide (PBO), N-octylbicycloheptenedicarboximide, propargyl propyl phenylphosphonate, and combinations thereof.

15. The method of claim 13, wherein the killing agent is selected from the group consisting of permethrin, deltamethrin, bifenthrin, fluvalinate, fenvalerate, esfenvalerate, lambda cyhalothrin, tetramethrin, cyfluthrin, resmethrin, allethrin, bioallethrin, esbiothrin, s-bioallethrin (ESBIOL®), d-allethrin; cypermethrin; zeta cypermethrin, tau fluvalinate, and combinations thereof.

16. The method of claim 13, wherein the killing agent is lambda cyhalothrin.

17. The method of claim 13, wherein the composition is directly sprayed onto the target pest or the target substrate or the target area in a non-aerosol form.

18. The method of claim 13, wherein the surface active agent is at or above 2.4% by weight and wherein the viscosity of the ready-to-use barrier and knockdown pesticide composition at room temperature is no more than 250 cps.

19. The method of claim 13, wherein the surface active agent is between 0.005% and 2.0% by weight and wherein the viscosity of the ready-to-use barrier and knockdown pesticide composition is greater than 100 cps at room temperature.

* * * * *